US011497229B2

(12) United States Patent
Chan et al.

(10) Patent No.: US 11,497,229 B2
(45) Date of Patent: Nov. 15, 2022

(54) TECHNOLOGY FOR WATER DISPERSIBLE PHOSPHOLIPIDS AND LYSOPHOSPHOLIPIDS

(71) Applicant: KEMIN INDUSTRIES, INC., Des Moines, IA (US)

(72) Inventors: Kok Ping Chan, Singapore (SG); Angeline Soo Zen Gue, Singapore (SG); Winston Sai Kaw Leow, Skudai (MY); Francesca Blasco, Singapore (SG)

(73) Assignee: KEMIN INDUSTRIES, INC., Des Moines, IA (US)

( * ) Notice: Subject to any disclaimer, the term of this patent is extended or adjusted under 35 U.S.C. 154(b) by 0 days.

(21) Appl. No.: 16/537,296

(22) Filed: Aug. 9, 2019

(65) Prior Publication Data

US 2020/0068920 A1 Mar. 5, 2020

Related U.S. Application Data

(60) Provisional application No. 62/725,917, filed on Aug. 31, 2018.

(51) Int. Cl.
*A23K 20/158* (2016.01)
*A23K 50/75* (2016.01)
*A23D 7/01* (2006.01)

(52) U.S. Cl.
CPC .............. *A23K 20/158* (2016.05); *A23D 7/01* (2013.01); *A23K 50/75* (2016.05)

(58) Field of Classification Search
CPC .................................. A23L 11/05; A23P 20/10
See application file for complete search history.

(56) References Cited

U.S. PATENT DOCUMENTS

| 4,804,546 | A | * | 2/1989 | Sawhill | A23K 20/158 |
| | | | | | 426/74 |
| 6,068,997 | A | | 5/2000 | Sas et al. | |
| 9,173,419 | B2 | | 11/2015 | Van Dyck et al. | |
| 2002/0098275 | A1 | * | 7/2002 | Bodnar | A23D 7/011 |
| | | | | | 426/612 |
| 2009/0324727 | A1 | * | 12/2009 | Foguet Roca | A61K 8/375 |
| | | | | | 424/489 |
| 2012/0004304 | A1 | | 1/2012 | Yun | |

(Continued)

OTHER PUBLICATIONS

International Searching Authority, "Search Report and Written Opinion," issued in connection with International Patent Application No. PCT/US2019/046008, dated Feb. 3, 2020, 12 pages.

*Primary Examiner* — Amber R Orlando
*Assistant Examiner* — Philip A Dubois
(74) *Attorney, Agent, or Firm* — Nyemaster Goode P.C.

(57) ABSTRACT

The present invention relates to methods of stabilizing phospholipids (PLs) and lysophospholipids (LPLs) in water. One aspect of the present invention relates to a method of stabilizing PLs and LPLs comprising treatment of the PLs and/or the LPLs with surfactants, co-surfactants, and a salt. Another aspect of the present invention relates to increasing the dispersion of PLs and LPLs in water and maintaining phase stability over a time period of over 12 months and a temperature range of −10 to 50° C. There are many advantages of the present invention including but not limited to improved feed mill efficiency, pellet quality, oil-water emulsification and animal performance when included in the feed.

8 Claims, 5 Drawing Sheets

(56) References Cited

U.S. PATENT DOCUMENTS

2013/0277468 A1* 10/2013 Dodd ................... A61K 9/1682
                                                          241/30
2015/0057157 A1     2/2015 Baseeth et al.
2016/0324150 A1* 11/2016 Baseeth ................... C05G 3/70

* cited by examiner

| Tube | Description | Remarks |
|------|-------------|---------|
| A | 10% LysoMILL in water | Stable solution under room temperature over 12 months |
| B | 30% LysoMILL in water | Stable solution under room temperature over 12 months |
| C | 10% Lysoforte Liquid in water | Product partially soluble in water. Floating globule formed immediately after mixing. |
| D | 10% Lysoforte Extend Liquid in water | Phase separation observed instantly after mixing. |

TECHNOLOGY FOR WATER DISPERSIBLE PHOSPHOLIPIDS AND LYSOPHOSPHOLIPIDS

CROSS-REFERENCE TO RELATED APPLICATIONS

This application claims priority to U.S. Provisional Patent Application No. 62/725,917, filed Aug. 31, 2018, entitled "TECHNOLOGY FOR WATER DISPERSIBLE PHOSPHOLIPIDS AND LYSOPHOSPHOLIPIDS," the entire disclosure of which is incorporated herein by reference.

BACKGROUND OF THE INVENTION

Supplementing broiler diets with fats and oils as an extra energy source has become common practice in the industry. However, young birds are deficient in the enzymes necessary for efficient digestion. A multitude of factors such as genetics, nutrition, disease conditions, physiology, feed type, among others, are involved in the digestion and absorption of nutrients. When health and management of the bird is good, nutrition has an essential role in improving the nutrient digestion and absorption. The nutrient digestion and absorption can be improved by the usage of agents that improve the permeability of the biological membranes and/or by supplementing the diet with salts and lipases.

Phospholipids aid in the emulsification and hydrolysis of fat but have no effect on the absorption of fat and other nutrients. When phospholipids are enzymatically hydrolyzed, they help in improving membrane permeability and increasing the flux of various nutrients across the cell. Lecithin serves as the source of phospholipids. The lecithin can be obtained from a plant (soybean, sunflower and rape seeds) or animal source (egg yolk). Generally lecithin is sourced from soybean due to its greater yield, easy availability and feasibility.

Lysophospholipids are known to enhance nutrients absorption and improve feed conversion rate. In the current practice, lysophospholipids are added either into the feed directly as a dry form, or in a form of liquid through oil mixture with other micro ingredients.

Lysophospholipids are made up of hydrophilic phosphatidylcholines and lipophilic fatty acid esters, as shown below:

General structure of lysophosphatidylcholines
(R = long chain alkyl group of fatty acids)

The innate oil soluble nature restricts the processing and application of lysophospholipids to primarily oil-based system. Coupled with the high viscosity of lysophospholipids, the mode of application in the feed mill is limited by the requirement of a separate applicator or dosing system. In many feed mills, the addition of water to the feed is critical in ensuring high feed pellet quality and profitability. However, lysophospholipids are hydrophobic and hence poorly water soluble. Direct addition of lysophospholipids in water can result in precipitation, leading to inhomogeneity in the distribution of active ingredients in the feed. In addition, it is generally understood in that art that stabilizing emulsifiers poses a challenge.

Because of the difficulties involved with the lack of solubility of LPLs in water, the feed industry has commonly bypassed or ignored the issue by simply adding LPLs to oil-based mixtures which results in the same inefficiencies with the feed mill process. One attempted method of achieving a homogeneous oil-water solution has been through the addition of surfactants to the LPL mixture and subjecting the mixture to high speed agitation. This process, however, only creates a kinetic driving force to break the immiscible particles into smaller sizes that are still thermodynamically unstable. Once the kinetic energy supplied is insufficient to overcome the agglomeration energy, phase separation will still occur.

For these and other reasons, there is a need for the present invention.

SUMMARY OF THE INVENTION

The present invention relates to methods of increasing the stability of phospholipids and lysophospholipids (LPLs) and improving the dispersability of the LPLs in water. The unique composition of the present invention has many benefits, for instance improved dispersion in water and enhanced stability, including but not limited to enhanced phase stability, i.e. no phase separation.

According to at least one embodiment, the LPLs are combined with one or more nonionic surfactants. During this step, the surfactants create a hydrophilic and lipophilic balance between the LPLs and water. A co-surfactant system is used to break up agglomerations that may form. The LPL composition is stabilized with a salt solution to increase its ionic strength. The resulting LPL composition is capable of being dispersed in a water to a much higher extent then untreated LPLs.

The methods and processes disclosed herein confer many benefits over conventional processes. First, the surfactants bridge the hydrogen-lipophilic balance (HLB) gap between LPLs and water. Second, the inclusion of co-surfactants enhances the emulsification process by increasing the polar interactions between surfactant molecules. Third, the salt solution balances the ionic strength in the solution and further creates a particle cage to stabilize the LPLs and chemical surfactants resulting in overall phase stability of the LPL solution over a broad temperature range of 50° C. to −10° C. which allows the composition to remain stable even at low temperatures and can therefore be shipped to colder regions throughout the world. The unique stabilization process extends the shelf-life of the final composition substantially, allowing it to remain stable for at least 12 months. The stabilized product enables lysophospholipids to be added directly into water which has a positive impact on mill efficiency. The product further enhances animal performance through better nutrients absorption.

BRIEF DESCRIPTION OF THE FIGURES

FIG. 1 depicts the intricate relationship of the synthetic emulsifiers, co-surfactants and salt solution. The image along with each double-headed arrow depicts inclusion of the two components linked by the arrow with Bolec. The center image is the final formulation (referred herein as LYSOMILL), showing a thoroughly dispersed solution that remains stable for more than 8 months.

DETAILED DESCRIPTION OF THE INVENTION

The present invention relates to methods of improving the dispersion of phospholipids and lysophospholipids in water. The resulting composition is miscible in both water and oil to provide flexibility in application at the feed mill, and remains stable in up to a 30% aqueous solution. The resulting composition further has low viscosity and lowers the surface tension of water.

The present invention may be used to treat any type of phospholipid (PL) or lysophospholipid (LPL) As used herein, "LPLs" are intended to designate the compositions to be treated which may include either or both of PLs and LPLs. Phospholipids are lipids containing phosphorus, a polar portion, and a non-polar portion. According to the alcohols contained in the phospholipids, they can be divided into glycerophospholipids and sphingomyelins. Lysophospholipids are a subgroup of glycerophospholipids in which one acyl chain is lacking and then only one hydroxyl group of the glycerol backbone is acylated. Lysophospholipids include, but are not limited to, lysophosphatidylcholine (2-LPC), lysophosphatidic acid (LPA), lysophosphatidylethanolamine (LPE), lysophosphatidylinositol (LPI), and sphingosine-1-phosphate (S1P). Bolec MT (Bolec) is a lecithin and lysolecithin mixture manufactured by Sime Darby Group, and according to at least one embodiment as a preferred LPL. Bolec contains a mixture of phospholipids and lysophospholipids in ratios ranging from 3:1 to 6:1.

According to at least one embodiment, in one aspect of the process, the LPL or LPLs are treated with one or more nonionic surfactants. Any nonionic surfactant is suitable for this purpose and include, but are not limited to alkylpolyoxyethylenes, Spans, and Tweens, including ethoxylated aliphatic alcohols, polyoxyethylene surfactants, carboxylic esters, polyethylene glycol esters, anhydrosorbitol ester and its ethyoxylated derivatives, glycol esters of fatty acids, carboxylic amides, monoalkanolaine condensates, and polyoxyethylene fatty acid amides. According to at least one embodiment, nonionic surfactants include but are not limited to polyoxyethylene sorbitan fatty acid esters, and in at least one embodiment is a combination of ethoxylated castor oil (EL35) and Tween 80.

The surfactants can generally be combined with the LPLs in a ratio ranging from about 8:1 to about 1:8 by weight, with for instance about 2:1 to about 6:1 by weight LPL to surfactant being preferred, and about 1:1, or alternatively about 1.5:1, by weight LPL to surfactant being most preferred. According to at least one embodiment, the ingredients are mixed at room temperature (25-30° C.) with agitation. According to at least one embodiment the ingredients are mixed with agitation to improve miscibility, whereby smaller batches are mixed using a magnetic stir bar at 400-600 rpm, and larger batches are mixed using a mechanical agitator at a speed of less than 300 rpm. Unlike other oil-water-surfactant systems, the ingredients can also be mixed without high speed agitation or homogenizer.

As already noted, the surfactant system is necessary to create a hydrophilic and lipophilic balance between the LPL and water. The surfactant system alone may be insufficient to enable the LPLs to disperse in the water due to the presence of complex fatty acid esters in the mixture. This results in the tendency for the components in the treated LPL composition to form aggregates in water.

A co-surfactant system is used to break the agglomerations formed. This involves adding one or more co-surfactants to the treated LPL composition. Co-surfactants are chemicals added to surfactants to enhance the effectiveness of the surfactants. These would be readily understood by persons of ordinary skill in the art and include alcohols or amines ranging from C4 to C10 and help in the formation and stabilization of micelles/microemulsions. Any co-surfactant can be used for this purpose including, but not limited to:

short-chain alcohols: ethanol, benzyl alcohol, isopropanol, phenethyl alcohol;
alkane diols and triols: propylene glycol, glycerol, butylene;
polyethylene glycols (PEG): PEG 400
glycol ethers: diethylene glycol monoethyl ether (Transcutol), tetrahydrofurfuryl PEG ether (tetraglycol or glycofurol);
pyrrolidine derivatives: N-methyl pyrrolidine (Pharmasolve), 2-pyrrolidine (Soluphor P);
bile salts: sodium deoxycholate;
organic acids and salts: caprylic acid, sodium caprylate, potassium sorbate;
thiols and organo-selenium based reagents; and/or
amino acids.

According to at least one embodiment of the present invention, anionic and acid co-surfactants are used. In at least one embodiment, the co-surfactants include but are not limited to glycerol and propionic acid. In another embodiment, the co-surfactants are a combination of glycerol and propionic acid. The co-surfactants can generally be combined with the LPLs in a ratio ranging from about 8:1 to about 1:8 by weight, with about 2:1 to about 8:1 by weight LPL to co-surfactant being preferred, and about 5:1 to about 6:1 by weight LPL to co-surfactant. According to at least one embodiment the ratio is about 2:1 to 3:1 by weight LPL to co-surfactant. According to at least one embodiment, the co-surfactants are mixed in the composition at room temperature with the use of agitation.

The co-surfactants can form hydrogen bonds effectively with the LPL molecules. However, the energy released is only sufficient for the surfactants to intercalate with the LPLs, but unable to compensate the energy required for the components to interact with water molecules. As such, a salt solution is added to the mixture to stabilize the system by increasing its ionic strength. Any water soluble salt solution will work for this purpose including, but not limited to, salt solutions of halides, nitrates, sulfates, etc. Transition metal salt solutions, such as iron (II) chloride, will not work for this purpose due to Lewis acidity, potential chelation effects and redox reaction. By way of non-limiting example, the salt solution is sodium chloride, and may be added in a concentration of from about 5-50% by weight, with about 10-20% by weight being preferred, and about 15-17% by weight being most preferred. Persons of ordinary skill would appreciate that other salt solutions could be substituted.

The salt solution can generally be combined with the LPL mixture as an aqueous solution in a ratio ranging from about 10:1 to about 1:10 by weight, with about 2:1 to about 8:1 by weight salt solution to LPL being preferred, and about 3:1 to about 5:1 by weight salt solution to LPL being most preferred. Alternatively, the salt crystals can be added directly the composition. The increase in ionic strength provided by the salt solution creates a tighter and stronger interaction between the LPLs and phospholipids with water molecules, thus enabling dispersion of up to 30% of the LPL product in water. However, if the strength of the salt solution is too high it will weaken the interaction between the LPLS and phospholipids with the water molecules, for instance no more than 20% salt solution.

The ingredients of the invention can either be mixed sequentially or can be added all at once to achieve the unique composition of the invention. In one embodiment, the co-surfactants are first added to the aqueous salt solution, followed by the addition of the more viscous phospholipids/lysophospholipids and the surfactants.

As previously noted, the unique process of the invention enables oil soluble LPLs to be dispersed in water without phase separation over a prolonged period of time. The invention provides the additional advantages of:

1) No need for elaborate equipment (e.g. homogenizer, high speed agitation) required to achieve complete miscibility of multiphasic systems;
2) No need for a multi-liquid dosing system in feed mill applications;
3) Allows flexibility for the user to carry out oil and/or water application into the feed;
4) Low viscosity and highly fluid to facility product transfer and easy quantification using a load cell or flow meter; and
5) Circumvents the use of phase-transfer reagents such as tetrabutylammonium bromide to shuttle oil-based lysolecithin into aqueous phase.

The following examples are offered to illustrate but not limit the invention. Thus, it is presented with the understanding that various formulation modifications as well as method of delivery modifications may be made and still are within the spirit of the invention.

EXAMPLES

TABLE 1

| Exemplary water dispersible LPL formulation | | |
|---|---|---|
| Functionality | Ingredient | Composition (%) |
| Key active ingredient | Bolec MT | 15 |
| Surfactants | Ethoxylated castor oil (EL35) | 4.25 |
| | Tween 80 | 7.5 |
| Co-surfactants | Glycerol | 2.75 |
| | Propionic acid | 3.0 |
| Ionic strength and density balancing | Sodium chloride (anhydrous) | 10.8 |
| | Water | 56.7 |
| | Total | 100 |

The ingredients were mixed at room temperature (25-30° C.) and agitated using a magnetic stir bar at 400-600 rpm.

Figure 1:
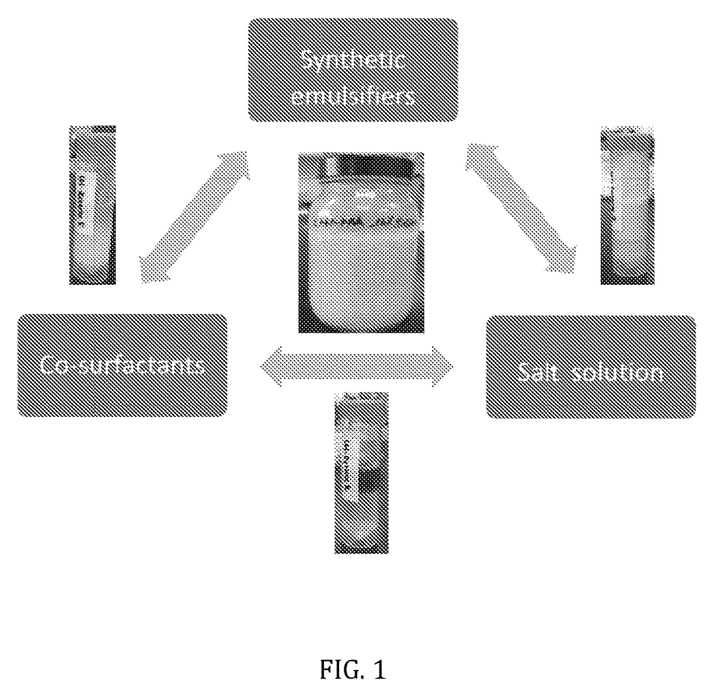
Figure 2:
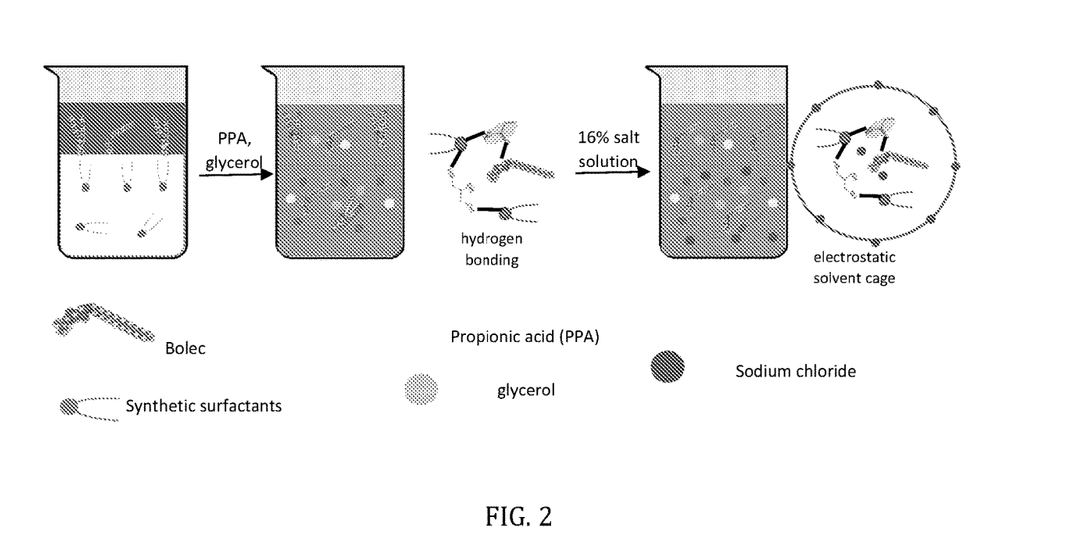
FIG. 2 is a schematic representation of the development of LYSOMILL.
Figure 3:
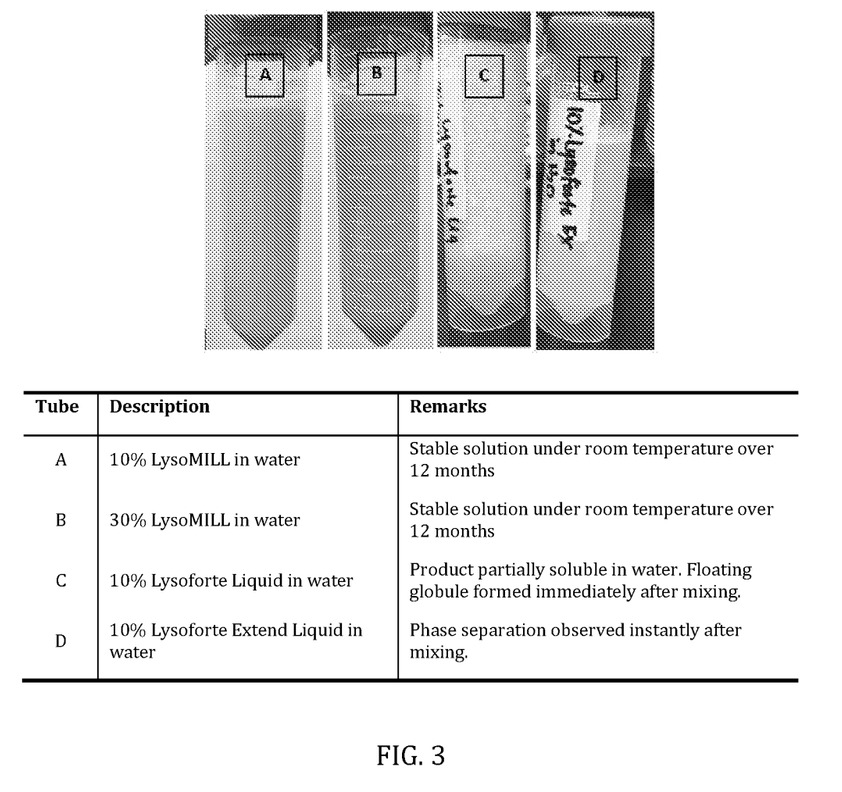
FIG. 3 depicts the water dispersibility studies of LYSOMILL against commercially available lysolecithin containing products (LYSOFORTE Liquid and LYSOFORTE Extend Liquid).

The process included three intricately-linked elements to stabilize Bolec in water (FIG. 2). The synthetic surfactants system created a hydrophilic and lipophilic balance between Bolec and water. This system alone was insufficient to enable Bolec to disperse in the water because of the presence of complex fatty acid esters in the mixture. This resulted in the tendency for the components in Bolec to form aggregates in water. To break the agglomerations, a co-surfactant system comprising propionic acid and glycerol was used. These components can form hydrogen bondings effectively with the lysolecithin molecules and intercalate them with the synthetic surfactants in the mixture. However, the mixture was still thermodynamically unstable due to high dispersion forces in water. In addition, the density of the final mixture of Bolec, surfactants and co-surfactants was not compatible with water. The 16% salt solution stabilized the system by increasing the ionic strength (FIG. 3). This increase in overall charge of the system created a stronger interaction between the lysophospholipids and phospholipids with water molecules, thus enabling dispersion of up to 30% of the product in water.

The Bolec and synthetic surfactants were immiscible because of high energy barrier for Bolec to remain as aggregates. It is entropically unfavorable or Bolec to be dispersed in water. In the presence of propionic acid and glycerol, extensive hydrogen bonding can be formed between the components in the system. However, the energy released is only sufficient for the surfactants to intercalate with Bolec, but unable to compensate the energy required for the components to interact with water molecules. With 16% salt solution, the ionic strength in the system is adequate to provide a solvent cage for the particles to be dispersed in water. One aspect of the present invention relates to compositions with improved stability. For instance, the present invention includes compositions with the following features:

1 Miscible in water and remains stable in a 10% and 30% aqueous solution. A 10% solution of LYSOFORTE LIQUID and LYSOFORTE EXTEND LIQUID were used as control (FIG. 3, Table 2). LYSOFORTE LIQUID and LYSOFORTE EXTEND LIQUID are commercial products available from Kemin Industries, Inc. (Des Moines, Iowa).

TABLE 2

Water dispersibility studies

| Tube | Description | Remarks |
|---|---|---|
| A | 10% LysoMILL in water | Stable solution under room temperature over 12 months |
| B | 30% LysoMILL in water | Stable solution under room temperature over 12 months |
| C | 10% Lysoforte Liquid in water | Product partially soluble in water. Floating globule formed immediately after mixing. |
| D | 10% Lysoforte Extend Liquid in water | Phase separation observed instantly after mixing. |

2. Low viscosity.

The composition of the present invention (referred herein as LYSOMILL) has a viscosity of 363 cps measured at room temperature. Comparing with Bolec and LYSOFORTE LIQUID, the product has a much lower viscosity. This product does not require special equipment to handle high viscosity liquid, hence increasing the ease of use of the product.

3. Decreased surface tension of water to 37.4 mN/m in a 1% aqueous solution

4. Stable formulation that is stable and does not phase separate over a temperature range of 50° C. to −10° C.

5. Miscible in oil and remains stable up for 60 minutes.

As shown above, in the study conducted, when salt is added to the LYSOFORTE products, separation occurs. The inventors, however, surprisingly discovered that when salt is added to the phospholipids/lysophospholipids compositions of the present invention, further comprising by way of non-limiting example surfactants and co-surfactants, the addition of salt solution actually prevents separation.

LPL compositions have little tolerance to compositional changes. Variation in salinity of the salt solution will impact the temperature stability of the product. Changes in the types and composition of co-surfactants will result in immediate separation of the product. Step-wise adjustment of the amount of Bolec in the system will alter the viscosity of the product, thus impacting the ease of use and eventually phase separation in the product.

The present invention confers several advantages over existing technology and products.

Figure 4:
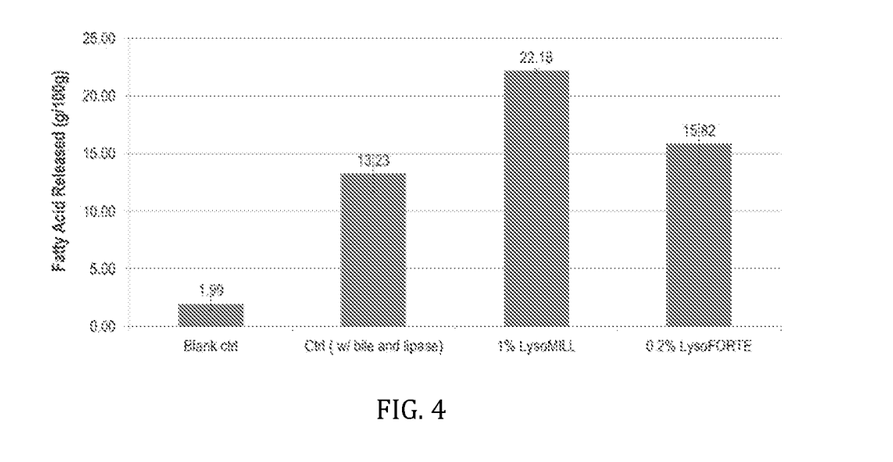
FIG. 4 depicts the in vitro fat digestion assay to evaluate efficacy of bioemulsifier containing products. LYSOFORTE refers to LYSOFORTE Liquid. 1 g of LYSOMILL contains the same amount of bioemulsifier in 0.2 g of LYSOFORTE Liquid. LYSOMILL showed significantly higher fat digestion in an in vitro model.

1. No elaborate equipment (e.g. homogenizer, high speed agitation) required to achieve complete miscibility of the multiphasic systems for the manufacturing of LYSOMILL
2. No need for multi-liquid dosing system in feed mill application
3. Allows flexibility for user to carry out oil or/and water application into the feed
4. Low viscosity and highly fluid to facility product transfer and easy quantification using load cell or flow meter
5. Enhanced in vitro lipid digestibility. A digestibility test was conducted. Palm oil was treated with lipase and bile salt and the amount of fatty acid released due to enzymatic hydrolysis was determined. The results were compared with on-top treatment with LYSOMILL and LYSOFORTE LIQUID normalized to equivalent amount of bioemulsifier in the system (FIG. 4, Table 3).

TABLE 3

Treatment groups in fat hydrolysis studies of LYSOMILL.

| Treatment | Oil in buffer solution | Bile and lipase | 1% LysoMILL | 0.2% LYSOFORT LIQUID ® |
|---|---|---|---|---|
| Blank control | ✓ | — | — | — |
| Negative control | ✓ | ✓ | — | — |
| 1% LysoMILL | ✓ | ✓ | ✓ | — |
| 0.2% LYSOFOR LIQUID | ✓ | ✓ | — | ✓ |

Figure 5A:
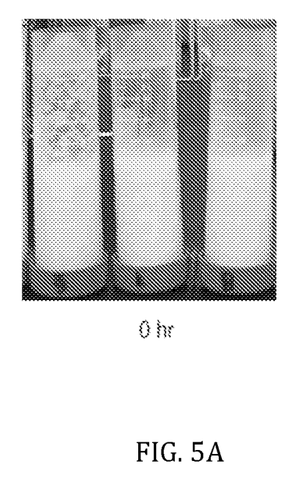
FIGS. 5A, 5B, 5C depict an oil-water emulsification studies showing high emulsification efficiency of LYSOMILL.
Figure 5B:
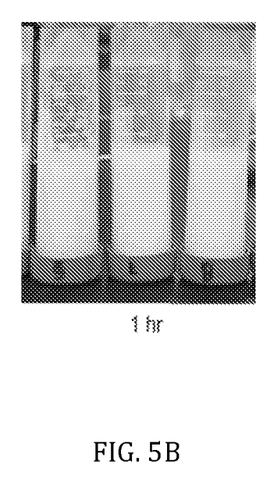
Figure 5C:
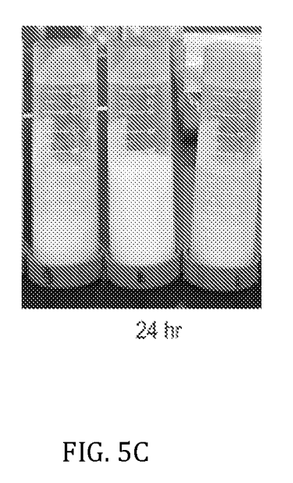
Figure 6A:
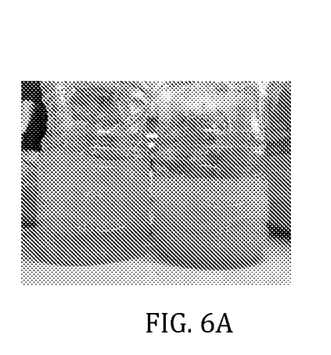
FIG. 6A is an oil and water emulsion treated with Bredol (bottle on the left) and LYSOMILL (bottle on the right) Emulsion was manually stirred prior spraying into the mixing tank. Separation was noted in emulsion treated with Bredol 100 minutes after stirring.
Figure 6B:
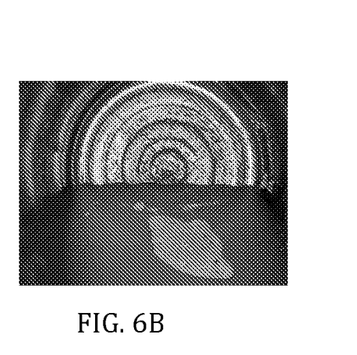
FIG. 6B is an oily deposition (orange arrows) observed at the bottom of container after mixing 10% Bredol in oil/water emulsion.

6. Enable emulsification of a 3:1 oil-water mixture with stability up to 24 hours. An emulsion of palm oil and water was produced at room temperature using 1% LYSOMILL and 0.2% LYSOFORTE LIQUID (normalized based on Bolec content in the final mixture). The emulsions were prepared in a 50 mL centrifuge tubes and the degree of separation was monitored qualitatively over time (FIG. 5).

Mill Efficiency Trial

The feed milling efficiency of LYSOMILL was demonstrated in a trial conducted at the Bangkok Animal Research Center (BARC) Co. Ltd, Thailand. The feed mill has a capacity of 0.2 MT/batch of feed production, and the trial comprised of 4 treatment groups with 4 batches per treatment. Temperature was measured using a fixed thermostat located in the feed miller conditioning chamber, while the rest of parameters were manually controlled at the control panel on site. The untreated feed served as control (T1), while T2 and T3 has 1 kg/T LYSOMILL. In T2, the product was dosed into the water prior to mixing into feed while spraying the oil from a separate nozzle while in T3, the product was added into the oil/water emulsion prior dosing. T4 involved addition of 0.5 kg/T of a commercially available processing emulsifier (Bredol) into oil/water emulsion before dosing into feed (Table 4).

TABLE 4

Treatment groups in feed milling efficiency trial.

| Treatment | Product | Dosage | Remarks |
|---|---|---|---|
| T1, Control | — | — | Untreated feed Positive control |
| T2, Water application | LYSOMILL | 1 kg | LYSOMILL in 10 kg water per tons of feed and add the solution into feed with the addition of oil from a separate nozzle. |
| T3, Emulsion application | LYSOMILL | 1 kg | LYSOMILL in 10 kg water and oil mixture to form an emulsion prior to spraying into feed. |
| T4, Emulsion application | Bredol | 0.5 kg | Bredol in 10 kg water and oil mixture to form an emulsion prior to spraying into feed. |

The results showed that LYSOMILL treatment in both water and oil-water emulsion application provided significant benefits to both feed pellet quality and production efficiency. Treatment of LYSOMILL improved moisture retention and PDI of the pellets without significant increase in water activity. In addition, the inclusion of LYSOMILL reduced the motor amperage and achieved a higher production throughput (Table 5). Taken together, LYSOMILL provided an overall reduction in energy consumption, leading to a more efficient feed milling process with higher return of investment. Feed treated with LYSOMILL also outperformed that treated with commercially available processing emulsifier in feed milling efficiency and pellet quality.

TABLE 5

Comparison of feed milling efficiency and pellet quality of LYSOMILL between different treatment methods and against commercially available processing emulsifier

| Parameters | T1 | T2 | T3 | T4 |
|---|---|---|---|---|
| Moisture (%) | 11.5 | 12.2 | 12.1 | 12.0 |
| Water Activity (Aw) | 0.65 | 0.68 | 0.68 | 0.66 |
| PDI (%) | 96.7 | 97.5 | 97.9 | 97.1 |
| Pellet Mill Motor Amperage (amp) | 28.6 | 27.9 | 27.8 | 27.7 |
| Production Yield (TPH) | 0.75 | 0.94 | 0.98 | 0.86 |
| Pellet Mill Energy Usage (kWh/ton) | 27 | 21 | 20 | 23 |

T1—untreated control;
T2—LYSOMILL treatment through water application;
T3—LYSOMILL treatment through emulsion application;
T4—Bredol treatment through emulsion application.

Figure 7A:
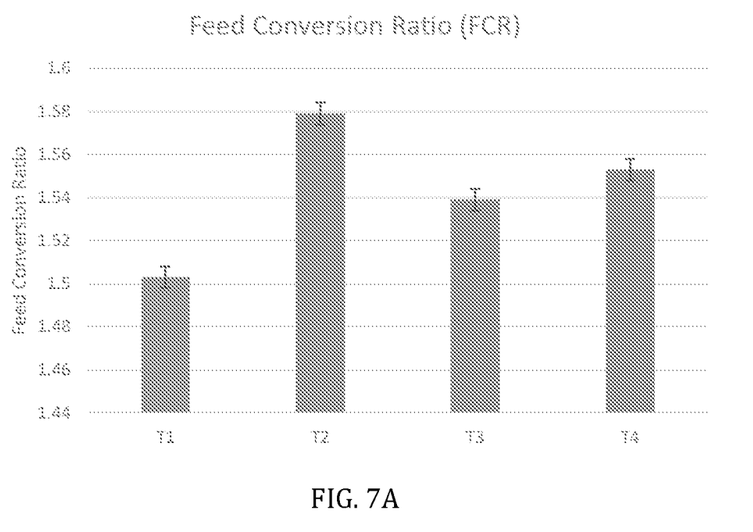
FIGS. 7A, 7B, 7C depict the effect of LYSOMILL treatment on animal performance with respect to (A) FCR; (B) body weight gain; and (C) apparent metabolizable energy (AME). Different letters across each chart denotes significant difference at $P<0.05$.
Figure 7B:
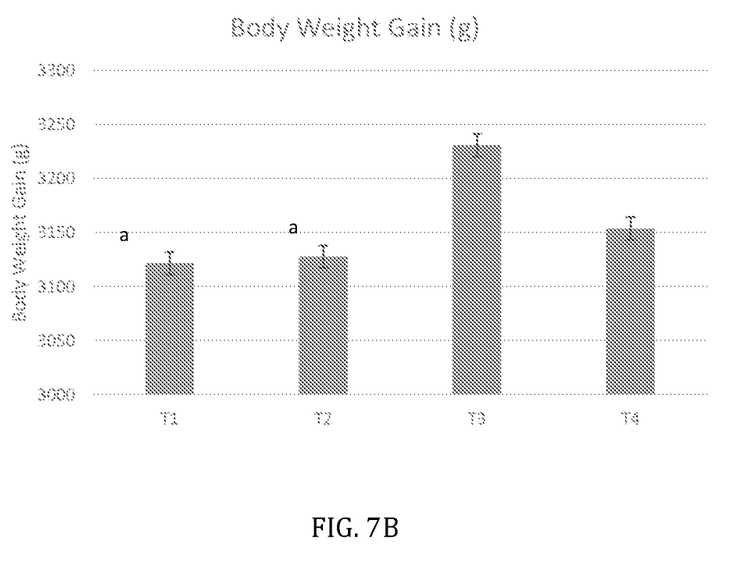
Figure 7C:
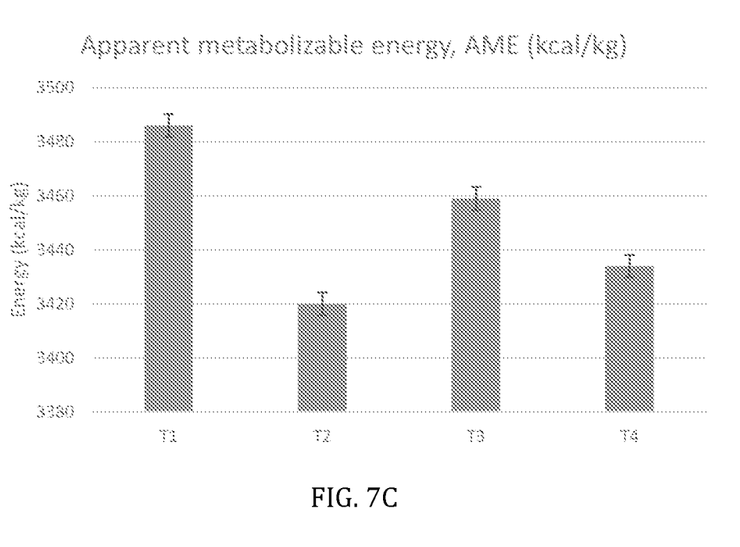

LYSOMILL is a bio-emulsifier system designed to bring feed milling benefits and animal performance in a single application into feed. The low viscosity and high water dispersibility are the key features of LYSOMILL that differentiates from bio-emulsifier products in the market. The water solubility and emulsification capability of LYSOMILL has been well demonstrated. For instance, in a feed mill setting, these attributes provide flexibility to the feed milling process. In comparison with Bredol, LYSOMILL forms an emulsion that has at least 30% longer stability. It has been demonstrated that the miscibility of LYSOMILL in water is significantly better than Bredol. It was observed that Bredol in water formed residual globules before oil was added to form an emulsion (FIGS. 7A and 7B). On the other hand, LYSOMILL can either be added into water, oil or in combination without significant impact on stability and final morphology of the emulsion.

Animal Performance Trial

The effect of LYSOMILL on the performance broiler flocks with respect to body weight, FCR and energy sparring effect was evaluated in an animal performance trial conducted at BARC. Two hundred and forty (240) newly hatched male broiler chicks of commercial strain (Ross 308) were allocated to 4 treatment groups with 6 replications using 10 birds in a pen as an experimental unit. T1 was untreated control diet. T2 was negative control (NC) diet with reduced energy of 100 kcal/kg. T3 was NC supplemented with LYSOMILL at 1 kg/T with water mixing application. T4 was commercially available processing emulsifier (Bredol) in oil/water emulsion mixing application. The feed underwent pelleting process with a conditioning temperature of 85° C. and achieved a pellet size of 3 mm in diameter. Animal growth performance was evaluated over a period of 42 days. Broilers fed with LYSOMILL supplemented diet (T2) increased the overall body weight and averaged daily weight gain in the starter, grower and finisher phase when compared with NC diet (FIGS. 8A, 8B, 8C). LYSOMILL supplementation also significantly improved feed conversion rate (FCR) by 4 points as compared to the NC diet. The researchers observed a reduction in the abdominal fat on the broiler carcass that were supplemented with LYSOMILL. In general, LYSOMILL demonstrated better growth performance as compared to the commercial processing emulsifier, together with a significant energy sparring effect of 50 kcal/kg against the NC diet.

It should be appreciated that minor dosage and formulation modifications of the composition and the ranges expressed herein may be made and still come within the scope and spirit of the present invention.

Having described the invention with reference to particular compositions, theories of effectiveness, and the like, it will be apparent to those of skill in the art that it is not intended that the invention be limited by such illustrative embodiments or mechanisms, and that modifications can be made without departing from the scope or spirit of the invention, as defined by the appended claims. It is intended that all such obvious modifications and variations be included within the scope of the present invention as defined in the appended claims. The claims are meant to cover the claimed components and steps in any sequence which is effective to meet the objectives there intended, unless the context specifically indicates to the contrary.

The foregoing description has been presented for the purposes of illustration and description. It is not intended to be an exhaustive list or limit the invention to the precise forms disclosed. It is contemplated that other alternative processes and methods obvious to those skilled in the art are considered included in the invention. The description is merely examples of embodiments. It is understood that any other modifications, substitutions, and/or additions may be made, which are within the intended spirit and scope of the disclosure. From the foregoing, it can be seen that the exemplary aspects of the disclosure accomplishes at least all of the intended objectives.

The invention claimed is:

1. A stabilized phospholipid (PL)/lysophospholipid (LPL) composition comprising:
   up to 30% by weight of at least one phospholipid (PL) and/or lysophospholipid (LPL) completely dispersed in water;
   a mixture of co-surfactants, said co-surfactants being glycerol and propionic acid; and
   a salt;
   whereby the ratio of PL and/or LPL to the at least one co-surfactant is about 2:1 to 3:1.

2. A water dispersible phospholipid/lysophospholipid composition, said composition comprising:
   up to 30% by weight of at least one phospholipid (PL) and/or lysophospholipid (LPL) completely dispersed in water;
   a mixture of co-surfactants, said co-surfactants being glycerol and propionic acid;
   and a salt;
   whereby the ratio of PL and/or LPL to the at least one co-surfactant is about 2:1 to 3:1.

3. The water dispersible composition of claim 2 that is stable over a temperature range of −10 to 50° C.

4. The water dispersible composition of claim 2 that is stable in water for a time period of over 12 months.

5. The water dispersible composition of claim 2 wherein the salt is in an aqueous solution.

6. The water dispersible composition of claim 2 wherein the salt is a sodium chloride solution.

7. The water dispersible phospholipid/lysophospholipid composition of claim 1 comprising no more than 3% by weight propionic acid.

8. The water dispersible phospholipid/lysophospholipid composition of claim 2 comprising no more than 3% by weight propionic acid.

* * * * *